United States Patent [19]

Komine et al.

[11] 4,059,349
[45] Nov. 22, 1977

[54] PHOTOGRAPHING SYSTEM AND A MOTION PICTURE CAMERA USING THE SAME

[75] Inventors: Yoshio Komine, Tokyo; Noritsugu Hirata, Yokohama, both of Japan

[73] Assignee: Canon Kabushiki Kaisha, Tokyo, Japan

[21] Appl. No.: 575,171

[22] Filed: May 7, 1975

[30] Foreign Application Priority Data

May 10, 1974 Japan ................................. 49-51988

[51] Int. Cl.² .............................................. G03B 23/02
[52] U.S. Cl. ...................................... 352/72; 352/27; 352/174
[58] Field of Search ................... 352/27, 29, 72, 78 C, 352/174

[56] References Cited

U.S. PATENT DOCUMENTS

| | | | |
|---|---|---|---|
| 3,464,765 | 9/1969 | Broeckl | 352/72 |
| 3,825,327 | 7/1974 | Kosarko | 352/72 |
| 3,880,504 | 4/1975 | Marvin | 352/29 |
| T 920,009 | 3/1974 | Kosorpo | 352/72 |

*Primary Examiner*—Monroe H. Hayes
*Attorney, Agent, or Firm*—Toren, McGeady and Stanger

[57] ABSTRACT

The camera has a picture image recording mechanism to record a picture image on a picture image recording part of the film, a sound recording mechanism to record sound information at the film having sound recording part; a constant speed film feeding mechanism having a capstan and a pinch roller to run the film at a constant speed at a sound recording head part of the sound recording mechanism, and a release member which controls initiation of a camera and is mechanically linked selectively with the sound recording mechanism and the constant speed film feeding mechanism, and which can simultaneously record a picture image and sound at the film within the cartridge when the film cartridge for simultaneous sound recording is loaded. The system includes a change over mechanism for releasing the above mentioned mechanical link between said release member and the sound recording mechanism and the constant speed film feeding mechanism when the above mentioned silent film cartridge is loaded for placing the sound recording mechanism and the constant speed film feeding mechanism in an inoperative state irrespective of function of the release member, and mechanically linking said release member with the above mentioned sound recording mechanism and a constant speed film feeding mechanism when the above mentioned simultaneous sound recording film cartridge is loaded, so that the sound recording mechanism and constant speed film feeding mechanism are placed either in an operative state or an inoperative state corresponding to the action of the above mentioned release member.

22 Claims, 9 Drawing Figures

PHOTOGRAPHING SYSTEM AND A MOTION PICTURE CAMERA USING THE SAME

BACKGROUND OF THE INVENTION

1. Field of the Invention

The present invention relates to a photographing system and a motion picture camera using the same, which can selectively use a silent film cartridge housing a film which can record picture image only and a simultaneous sound recording film cartridge housing a film which can simultaneously record picture image and sound.

2. Description of the Prior Art

Recently, while a cartridge type film for picture image recording which is simple for handling and eliminating light leakage is widely used in a field of a small size motion picture, a cartridge film convenient for handling which can simultaneously record a picture image and sound has not been put into practical use.

However, present requirements for such a system which allows simple recording of a picture and sound on the same recording material are increasing more and more, and specifications of U.S. Pat. Nos. 3,561,851 and 3,604,790, etc. are known to disclose the same.

As the film cartridge housing a film allowing simple recording of a picture and sound on the same film, a film cartridge which has almost the same cartridge shape as a silent film cartridge housing a silent film being able to record a picture image only and being known generally as "Super 8", and has only one portion thereof being enlarged, is known. In a camera using a sound film cartridge housing a film which is able to record a picture and sound, a conventional silent film cartridge for picture recording only can be used also, and while a conventional camera which can use a silent film cartridge only has only a picture image recording mechanism, a motion picture camera, which can selectively use a silent film cartridge and a sound film cartridge and can record picture image and sound informations on the film when the sound film cartridge is loaded, has a sound recording mechanism besides the picture image recording mechanism. And as a method by which this sound recording mechanism record sound information signal on the sound recording part of the film, optical sound recording or magnetic sound recording, in which magnetic body is provided at the sound recording part of the film and making magnetic sound recording using a magnetic head at the magnetic body, is used, where by either method constant speed feeding of film is required at the sound recording means part to record sound for stabilizing sound quality. For this purpose, a constant speed film feeding mechanism by a capstan and a pinch roller is used frequently besides a film advancing mechanism for picture image photographing, and an elastic body of rubber type is used as the material for the pinch roller. Therefore, because the pinch roller is placed in a state where it is pressed against the capstan for a long time it is apt to have plastic deformation, and as plastic deformation takes place it causes difficulties in constant speed feeding of the film. Therefore, it is effective, in a motion picture camera allowing simultaneous recording of picture image and sound as mentioned above, to employ such a mechanism as having engagement and disengagement of a pinch roller with a capstan linked with shutter release action of the camera, thereby having the pinch roller pressed against the capstan only during photographing and having the pinch roller separated from the capstan when not in use. In this kind of a motion picture camera having such consideration, a pinch roller is provided at a position slightly separated from a capstan under normal conditions and the pinch roller is pressed against the capstan by a spring which is biased by release action. Therefore it has such shortcoming that an operator is required to use strong power to bias the spring of the pinch roller besides the light operating power required for ordinary release action. Since the strong operating power needs to be retained all through the photographing, when the photographer makes long time photographing operation, his finger, etc. operating the release is very likely to tire.

Also, in this kind of motion picture camera, usually silent photographing only for picture image is also possible using a silent film cartridge having no sound recording belt, and at the time of this silent photographing, not only the sound recording mechanism but the pinch roller action linked with release action is not necessary. Therefore, it causes loss not only in durability of the mechanism but in power to operate a capstan driving motor for a constant speed film feeding mechanism and the sound recording mechanism during the silent photographing. Also, the fact that the pinch roller pressing action is done each time release action is preformed, creates the difficulty wherein release action, which can be normally light, unnecessarily heavy even in silent photographing because the camera has the sound recording mechanism and the constant speed film feeding mechanism, and the life of the pinch roller, etc. will therefore be short.

SUMMARY OF THE INVENTION

A first object of the present invention is to provide a photographing system and a motion picture camera using the same which can selectively use a silent film cartridge and a sound film cartridge, eliminating the conventional problems mentioned above.

A second object of the present invention is to provide a motion picture camera which can be so selectively changed over depending on the type of film loaded that the linked relationship of the unnecessary sound recording mechanism and the constant speed film feeding mechanism for feeding film at a constant speed at the sound recording means part of the sound recording mechanism with the release member is nullified when a silent film cartridge is loaded, while the sound recording mechanism needed for recording sound on the film and the film constant speed feeding mechanism are linked with the release member when a sound film cartridge is loaded.

A third object of the present invention is to provide a motion picture camera which can selectively use a silent film cartridge and a sound film cartridge, allowing power supply to operate the sound recording mechanism and the film constant speed feeding mechanism and the film constant speed feeding mechanism only when the sound film cartridge is loaded, thus consuming less power.

A fourth object of the present invention is to provide a motion picture camera which can automatically detect the type of loaded film cartridge and can so automatically change over depending on the type of the loaded film that when the silent film cartridge is used the linked relationship between unnecessary sound recording mechanism and the film constant speed mechanism is automatically nullified while the sound recording mechansim necessary for recording sound on film and the film constant speed mechanism are linked with the operation of a release member when the sound film cartridge is detected.

a fifth object of the present invention is to provide a motion picture camera which allows light release operation.

Other objects of the present invention will be made clear from the specification and the drawings which will be explained below in detail.

DESCRIPTION OF THE PREFERRED EMBODIMENTS

Figure 1:
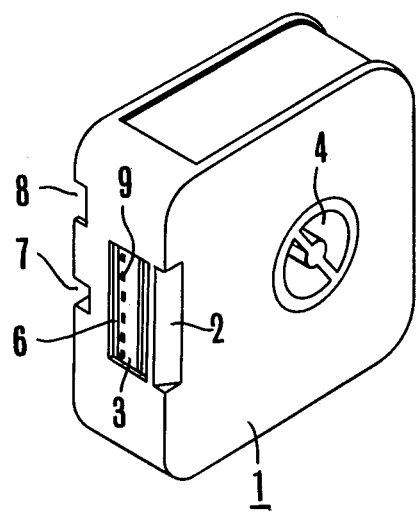
FIG. 1 is an oblique view of a conventional silent film cartridge housing a photographing film which is used for photographing not accompanying a sound signal recording part.

Now explanations will be made in detail concerning a preferred embodiment of a motion picture camera according to the present invention referring to the drawings.

Figure 2:
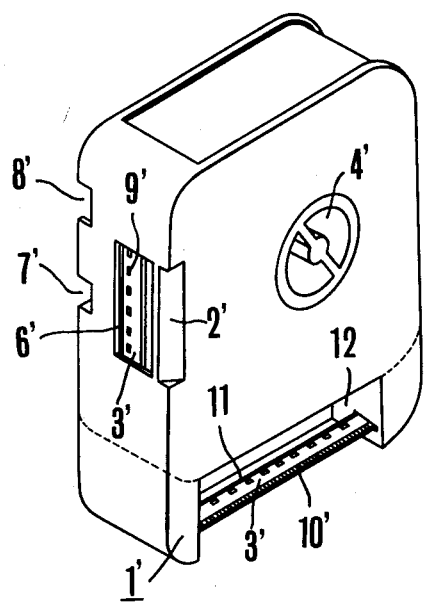
FIG. 2 is an oblique view showing an example of a sound film cartridge housing a photographing film allowing recording of sound signal together with photographing.

FIG. 1 is an oblique view of a conventional silent film cartridge housing a photographing film which is used only for photographing not having sound signal recording part, wherein 1 is a cartridge main body, 2 is a front end tapered part, 3 is a film housed in the cartridge main body, 9 shows perforation provided at the film 3. 6 is a film exposure window, 7 is a film position determing guide, 8 is a notch to indicate photo-sensitivity of the film 3, and 4 is a film take up reel. FIG. 2 is an oblique view to show an example of the sound film cartridge housing a photographing film allowing recording of sound signal along with photographing, wherein 1' is a cartridge main body corresponding to the cartridge main body 1 shown in FIG. 1. 2' is a front end tapered part, and 3' is a sound film having a sound recording magnetic coating part 10 and a balance belt part 11 thereon for allowing the recording of picture image and sound on the same. 9' shows perforation provided on the film 3'. 4' is a film take-up reel corresponding to the film take-up reel 4 shown in FIG. 1. 6' is a film exposure window corresponding to the film exposure window 6 shown in FIG. 1. 7' is a film position determing guide corresponding to the film position determing guide 7 shown in FIG. 1. 12 is a sound recording cartridge opening.

In other words, the silent film cartridge of FIG. 1 and the sound film cartridge of FIG. 2 have the same set-ups except that the sound film cartridge of FIG. 2 has the sound recording opening 12 while the silent film cartridge does not have the same, and that while the sound film 3' shown in FIG. 2 has the sound recording magnetic coating part 10 and the balance belt part 11, the silent film 3 shown in FIG. 1 does not have the same. And when the silent film cartridge is placed over the sound film cartridge shown in FIG. 2 in such manner that the film take up reels 4, 4' coincide each other, all of their structures and dimensions coincide each other except that the sound recording opening 4' of the sound film cartridge sticks out as shown in FIG. 2 in which the silent film cartridge is shown by broken lines.

Therefore, film cartridges, used in a motion picture camera which can selectively use a silent film cartridge and a sound film cartridge and can record simultaneously picture image and sound on a film in the cartridge when the sound film cartridge is loaded, and which is to be explained below, should preferably have such relationship as mentioned above for the silent film cartridge shown in FIG. 1 and the sound film cartridge shown in FIG. 2, but difference in their shape may be allowed to some extent.

Figure 3:
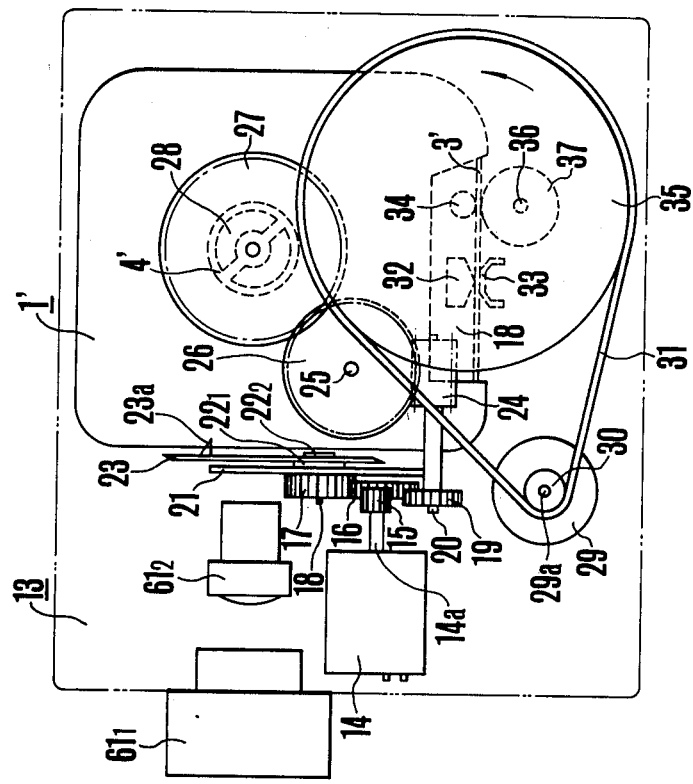
FIG. 3 is a plan view to show general set-up of a motion picture camera which can conduct simultaneous sound recording, showing a state in which the sound film cartridge shown in FIG. 2 is loaded and picture image and sound are being recorded on film.

FIG. 3 is a plan view to show general set-up of a motion picture camera allowing simultaneous sound recording, showing a state in which the sound film cartridge shown in FIG. 2 is loaded into a cartridge chamber and recording of picture image and sound is being done simultaneously.

In FIG. 3, 13 is a camera main body, $61_1$, $61_2$ are photographing lens barrels positioned on a same optical axis, and a photographing lens group consisting a plurality of lenses is positioned in each of the photographing lens barrels. 14 is a first motor to actuate a camera. 15 is a gear fixedly provided on a motor axle 14a of the motor 14. 16 is a gear fixedly provided on a rotating axle (not shown in the drawing) axially supported by a camera main body 13 in a rotatable manner, and the gear 16 is always in an engaged relationship with the gear 15. 17 is a gear fixedly provided at a rotation shutter axle 18 axially supported by the camera main body in a rotatable manner, and the gear 17 is always in an engaged relationship with the gear 16. 21 is a rotation shutter blade fixedly provided on the rotation shutter axle 18, and the shutter blade 21 rotates integrally with the rotation shutter axle 18 as the rotation shutter axle 18 rotates so that the light from an object which has come through photographing lens barrels $61_1$, $61_2$ is selectively allowed to be incident onto or shielded from being incident onto the films 3, 3' positioned at film exposure windows 6, 6' of the film cartridges, 1, 1' being positioned within the cartridge chamber of the camera main body 13, 22 is a cam for controlling film advancing member being fixedly provided by the rotation shutter axle 18, consisting of a face cam $22_1$ and a triangle cam $22_2$, and the above mentioned gear 17, the shutter blade 21 and the cam 22 are integrally formed. 23 is a film advancing member having a film advancing claw 23a, and the film advancing member 23 is always in contact with a face cam $22_1$ and a triangle cam $22_2$, wherein when the cam 22 is rotated by the rotation of the shutter rotation axle 18 the film advancing claw 23a is made to engage selectively with the perforations 9, 9' of the films 3, 3' positioned at the film exposure windows 6, 6' of the film cartridges 1, 1' being placed within the cartridge chamber of the camera main body 13, depending on its cam shape, for intermittently advancing and feeding the film by the advancing claw 23a to a predetermined film running direction having relationship with the action of the above mentioned shutter blade 21. The intermittent advancing and feeding mechanism for film consisting of the film advancing control cam 22 and the film advancing member 23 is a known means generally used in an ordinary motion picture camera. 19 is a gear fixedly provided at a rotation axle 20 axially supported by the camera main body 13 in a rotatable manner, and the gear 17 is always in an engaged relationship with the gear 16. 24 is a worm gear fixedly provided at the rotation shaft 20. 26 is a worm wheel fixedly provided at a rotation axle 25 axially supported by the camera main body 13 in a rotatable manner, and the worm gear 24 is always in an engaged relationship with the worm wheel 26. 27 is a gear fixedly provided at a rotation axle (not shown in the drawing) axially supported by the camera main body 13 in a rotatable manner, and the gear 27 is always in an engaged relationship with the worm wheel 26. 28 is a film take up reel driving member provided on a rotation member which rotates by the rotating force of the gear 27 receiving the friction by a friction member (not shown in the drawing), being positioned with the friction member being sandwiched between the gear 27 and the member 28, and the take up reel driving member 28 protrudes within the cartridge chamber of the camera main body 13. Accordingly the film cartridges 1, 1' are loaded into the cartridge chamber it engages with the film take up reels 4, 4' to rotate the film take up reels 4, 4'. 29 is a second motor to drive a film constant speed running mechanism for running with constant speed the film at the sound recording means part of the sound recording mechanism when the sound film cartridge is loaded. 32 is a magnetic head to magnetically record sound information at the sound recording magnetic coating part 10 of the film 3', and 33 is a head pad to have the magnetic head 32 contact with the magnetic head during sound recording, wherein the head pad 33 is placed at a position opposite to the magnetic head 32 and is placed, when sound recording is not done, at such position as not contacting with the magnetic head instead, being slightly separated from the magnetic head 32. 30 is a pulley fixedly provided at a motor axle 29a. 35 is a fly wheel axially supported at the camera main body 13 in a rotatable manner. 31 is an endless shape belt spanned between the pulley 30 and the outer circumference of the fly wheel 35, and the belt 31 is to transmit the rotating force to the fly wheel 35. 34 is a capstan fixedly provided at a rotation center of the fly wheel 35 for rotating integrally with the fly wheel 35. 37 is a pinch roller formed by rubber type elastic material axially supported on an axle 36 fixedly provided on a moving member (not shown in the drawing) in a rotatable manner, wherein the pinch roller 37 is placed at a position opposite to the capstan 34 and is placed, when sound recording is not done, at such position as not contacting with the capstan 34 by the moving member, but slightly separated from the capstan 34. The magnetic head 32 and the head pad 33 constituting the sound recording means part of the above mentioned sound recording mechanism and the capstan 34 and the pinch roller 37 constituting the film advancing part of the film constant speed running mechanism are in such a positional arrangement that at least one of the members is within the cartridge chamber while the other member is outside of the cartridge chamber so that the film 3' is positioned smoothly between the magnetic head 32 and the head pad 33 and between the capstan 34 and the pinch roller 37 when the sound film cartridge 1' is loaded into the cartridge chamber. Also, the amount of film advancing per unit time for the film advancing claw member 23 of the intermittent advancing means for film to advance the film 3' at the film exposure window 6' of the film cartridge 1' and the amount of film advancing per unit time for the capstan 34 or the film constant speed running mechanism and the pinch roller 37 to advance the film 3' at the sound recording cartridge opening 12 will become almost equal, and when their cycles do not coincide each other, there are provided such means, although not shown in the drawing, for detecting said non-coincidence to adjust the advancing speed of either one of the advancing mechanisms.

In a motion picture camera which has such set-up as mentioned above and can make simultaneous sound recording, as release initiation is made, the first motor 14 and the second motor 29 drives action and as the motor 14 makes driving, the driving force of the motor 14 rotates the gear 16 through the motor axle 14a and the gear 15. When the gear 16 is rotated, the rotation of the gear 16 is transmitted to the gear 17 to rotate the shutter axle 18, the shutter blade 21, and the cam 22 for controlling the film advancing member, and at the same time controls the film advancing member 23 by the cam 22, and intermittently feeds the films 3, 3' at the film exposure windows 6, 6' by the film advancing member 23, to a predetermined film advancing direction. On the other hand, as the gear 16 is rotated, the rotation of the gear 16 rotates the gear 27 through the gear 19, the axle 20, the worm gear 24, and the worm wheel 26. By the rotation of the gear 27, the take-up reel driving member 28 is rotated and the film take-up reels 4, 4' engaging with the take-up reel driving member 28 are also rotated. As the motor 29 is driven at the same time as the first motor 14, the driving force of the motor 29 rotates the capstan 34 through the motor axle 29a, the pulley 30, the belt 31 and the fly wheel 35.

Figure 4:
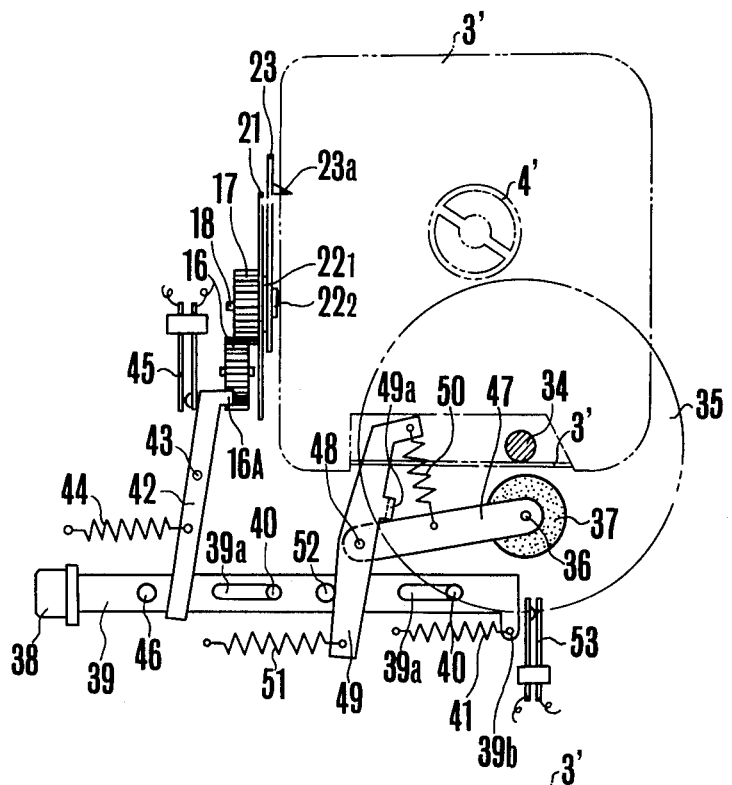
FIG. 4 is a plan view to show an example of a release mechanism of a conventional motion picture camera allowing simultaneous sound recording, showing a state in which the sound film cartridge shown in FIG. 2 is loaded but a release initiation has not been made.

FIG. 4 is a plan to show in detail the release mechanism of a motion picture camera which can make simultaneous sound recording, being shown in FIG. 3. In this drawing, the members with the same numbers as those for the members in FIG. 3 have the same functions, and for easy understanding of the set-up of the release mechanism, members not having much bearing on the release mechanism are omitted. In the same drawing, the operation lever 39 having the release button 38 has a guide groove 39a which will be fitted with the guide axle 40 being fixed on the main body 13. The operation lever 39 is always biased to the left direction by a spring 41 being hung on one end 39a of the lever. 16A is a notch provided at the gear 16. 42 is a stop lever rotatable around an axle 43 axially supported by the main body 13, and is always biased in a clockwise direction by a spring 44. 45 is a release switch to initiate the first motor 14. 46 is a pin attachedly provided at the operation lever 39, and the lever 46 rotates a stop lever 42 in a counterclockwise direction by pressing the release button 38 to place the release switch 45 in ON state, and at the same time disengage the stop lever 42 from the notch 16A of the gear. By this, the motor 14 rotates and the shutter blade 21 and the advancing mechanism 23 are allowed to be actuated to make film advancing. 47 is an arm to hold a pinch roller 37 and is held in place rotatably by the axle 48 fixed at the main body 13. 49 is a pinch roller activating plate and is provided in place rotatably and coaxially at the axle 48. A spring 50 is spanned between the activating plate 49 and the arm 47, and is made to have a predetermined distance. The activating plate 49 is always biased in the to clockwise direction by a spring 51, and is in contact with a pin 53 attachedly provided on the operation lever 39. 53 is a switch always opened for initiating the second motor 29 which rotates the capstan 34. Now, by pressing the release button 38 the operation lever 39 is slided to right direction from the state of this, drawing showing a non-active state. By this the switch 53 is closed and the capstan 34 is initiated. Also the pinch roller activating plate 49 is rotated in a counterclockwise direction by the pin 52, and, by this, the arm 47 is also rotated, and the pinch roller 37 attached to the arm 47 holds the film 3' between itself and the capstan 34 and presses the same against the capstan 34. By this, constant speed feeding of the film is made at the sound recording part by the capstan 34 and the pinch roller 37. On the other hand, as the stop lever 42 rotates by operating the release button 38 and advancing of photographing film is also initiated, simultaneous sound recording-photograhing is done. In such a set-up, the power required for an operator to make release operation will be combination of a power to resist a return spring 51 of the pinch roller activating plate 49 and a power of the spring 50 to have the pinch roller 34 a pressure contacted with the capstan 37, in addition to the power to resist a return spring of the operation lever 39 and the power to resist a spring 41 of the stop lever, which are unavoidably necessary in a conventional silent photographing camera for picture image recording only.

Figure 5:
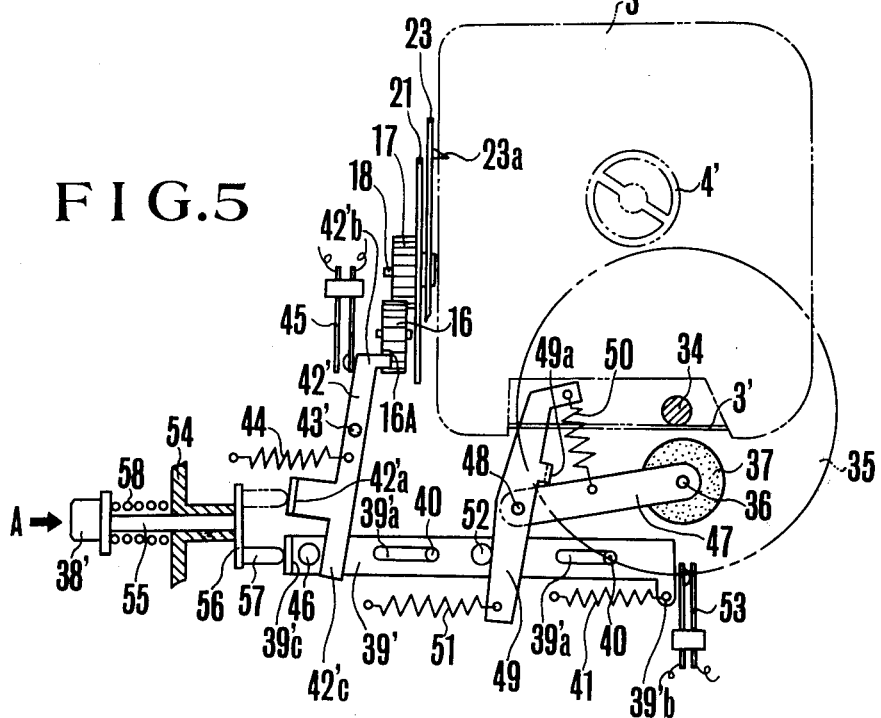
FIG. 5 is a plan view to show a motion picture camera allowing simultaneous sound recording according to the present invention, especially to a first example of its release mechanism in detail, showing a state in which the sound film cartridge shown in FIG. 2 is loaded but release initiation has not been made.
Figure 9:
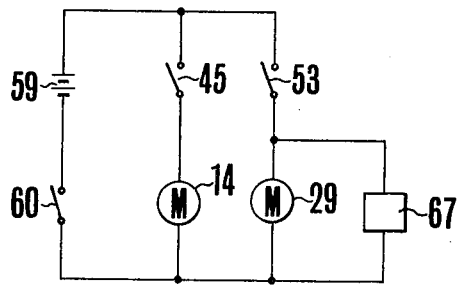
FIG. 9 is an electric circuit diagram which is applicable to first to fourth examples of a motion picture camera according to the present invention shown in FIG. 5, FIG. 6, FIG. 7 and FIG. 8.

FIG. 5 view is a plan to show an example of a motion picture camera allowing simultaneous sound recording shown in FIG. 4, especially of a motion picture camera according to the present inventon in which its release mechanism is improved, wherein the members with same numbers are those in FIG. 1 to FIG. 4 have the same function thus explanation thereof will be omitted. In this drawing, 54 is a metal fixed at the camera main body 13, and 38' is a release button. 55 is a shaft having a release button 38' protruding out of the camera main body 13 at its one end and having a rotating disk 56 fixedly provided at the other end thereof, and the shaft 55 is axially supported by the metal 54 in a manner slidable to left and right directions in the drawing, and is shifted to left end position when no external force is working on the release button 38' so that the release button 38' is pushed out to outside of a camera to the maximum extent by biasing power of a spring 58. The rotating disk 56 is axially supported at one end of the shaft 55 in a rotatable manner, and has a pin at its one disk plane in such manner as being almost parallel with the shaft 55 and extending to outside of said shaft 55. And the rotating disk 56 is rotatably shiftable from outside of a camera around the shaft 55, and, as it is rotated, the pin 57 may be stepwisely stopped at a first position shown by chain line in the drawing and at a second position shown by chain line in the drawing. 42' is a stop lever corresponding to the stop lever 42 shown in FIG. 4, and the stop lever 42' is rotatable around the axle 43 axially supported by the camera main body 13 and is rotatablly biased in a clockwise direction always by the spring 44, and at the same time has a bent part 42'a which is bent to such a position as corresponding to the pin 57 when the pin 57 is stopped at the second position, a stopper part 42'b which engages with the notched part 16A of the above mentioned gear 16 when the above mentioned stop lever 42 is shifted in a clockwise direction and is disengaged from the notched part 16A of the gear 16 when the stop lever 42 is shifted in a counter-clockwise direction, being moved to outside of the notched part 16A, and an engaging part 42'c which is positioned at opposite side of the stopper part 42'b with the axle 43 being intervened therebetween. 39' is an operation lever corresponding to the operation lever 39 shown in FIG. 4. The switch 45 is to control the driving of the first motor 14 to drive intermittent film feeding mechanism (17, 22, 23), while the switch 53 is to control the driving of the second motor 29 to drive the constant speed film feeding mechanism (34, 35, 37), and their control circuits are shown in FIG. 9. In FIG. 9, 59 is a power source, 60 is a main switch, and 67 is a sound recording circuit.

The function of the release mechanism of a motion picture camera according to the present invention having the above mentioned set-up will be explained referring to FIG. 5 and FIG. 9.

FIG. 5 shows a state in which the sound film cartridge 1' (shown by two dots chain line) is loaded and the rotating disk 56 is placed at the first position for simultaneous sound recording while no external force is working on the release button 38'. Therefore, in this stage, the capstan 34 and the pinch roller 37 are in a non-engaging state, while the stopper part 42'b of the stop lever 42' and the notched part 16A of gear 16 are engaged state, and the shutter blade 21 is stopped in front of the film exposure window 6' so that the light from an object penetrating through the photographing lens barrels $61_1$, $61_2$ is blocked from being incident into the exposure window 6'. Also the switches 45, 53, 60 are in OFF-state.

In this state, when external force is given to the release button 38' from the direction of arrow A in the drawing after placing the main switch 60 ON, the shaft 55 is guided by the metal 54 and as the pin 57 planted on the rotating disk 56 presses the operation lever 39' to right direction in the drawing, the operation lever 39' is slidingly shifted in the right direction in the drawing against the biasing power of the spring 41 to left direction in the drawing. As the operation lever 39' is slidingly shifted as mentioned above, the stop lever 42 being in contact with the pin 24 is rotated in a counter-clockwise direction with the axle 43 as fulcrum, and the engagement between the stopper part 42'b and the notched part 16A of gear 16 is released and at the same time the switch 45 is placed in the ON state. On the other hand, as the operation lever 39' is slidingly shifted as mentioned above, one end of the operation lever 39' contacts with the switch 53 placing the switch 53 in the ON state, and the pinch roller activating plate 49 is also rotatingly shifted in a counterclockwise direction with the axle 48 as fulcrum. As the pinch roller activating plate 49 is rotated in a counterclockwise direction, the arm 47 engaging with the pinch roller activating plate 49 through the spring 50 is pulled by the spring 50 and is rotatingly shifted in a counterclockwise direction with the axle 48 as fulcrum, then the pinch roller 37 comes in contact with the capstan 34 through the film 3'.

That is, by rotating the first motor 14 and the motor 29 as the switches 45, 53 become ON, the operation of the constant speed film running mechanism by the capstan 34 and the pinch roller 37 being same as that explained in FIG. 3 and the film feeding mechanism 22, 23 are done, thus a simultaneous sound recording photographing is performed simultaneously recording sound and picture image of the film 1' on the sound film cartridge 3'. Also, as the working A of the release button 38' is removed the state of FIG. 5 is resumed in an order reverse to that mentioned above.

While explanations are made above in the case when the sound film cartridge 1' shown in FIG. 2 is loaded to conduct simultaneous sound recording photographing, now explanations will be made concerning operations in a case when the silent film cartridge shown in FIG. 1 is loaded to conduct silent photographing. When silent photographing is done, first the release button 20 is rotated and the pin 57 is placed at the second position as shown by the dotted line in FIG. 5. In this state, the pin 57 escapes from the bent part 39'c of the operation level 39' and at the same time is positioned at the bent part 42'a of the stop lever 42'. When the release button 38' is pressed while the pin 57 is in the state shown by broken line of FIG. 5, the stop lever 42' is rotated in a counter-clockwise direction around the axle 43, the engagement between the notched part 16A of the gear 16 and the stopper part 42'b of the stop lever 42' is released and at the same time the switch 45 is made ON and the first motor 14 is started to start feeding of photographing film.

On the other hand, the operation lever 39' does not receive the function of the pin 57 and keeps its state shown in FIG. 5, therefore the switch 53 is placed in the ON state and the pinch roller 37 is placed in a state not being engaged with the capstan 34. That is, in this state, the external force A of the release button 38' does not effect the operation lever 39'. Therefore, since the operation lever 39' does not have to work when silent photographing only is needed, the heavy operation force of the release button 38' needed to operate the operation lever 39' is not required at all time, and the release button 38' can be operated with very light touch at the time of silent photographing, further, when only silent photographing is needed, power supply to the sound recording means 32, 33, 34, 37 which are not needed for silent photographing is not done, the power consumption can be saved. Also, in the example shown in FIG. 5, the change over of the release operation between sound recording and silent is made by the rotation of the release button 38' using the shaft 55 as rotation axis, but this may be done by providing other change over means, also when sound recording is not necessary even if the sound film cartridge 1' is loaded, the operation lever 39' does not have to work by placing the pin 57 at the second position.

Figure 6:
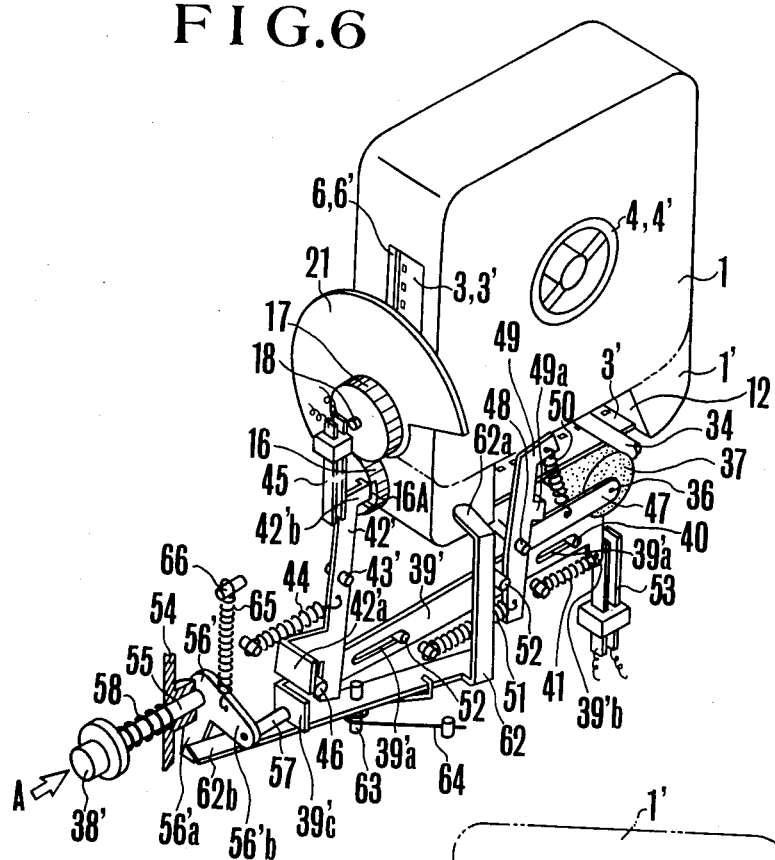
FIG. 6 is an oblique view to show a motion picture camera allowing simultaneous sound recording according to the present invention, especially a second example of its release mechanism in detail, showing a state in which the sound film cartridge shown in FIG. 2 is loaded but release initiation has not been made.

FIG. 6 is an oblique view to show in detail a second example of a motion picture camera which can conduct simultaneous sound recording according to the present invention particularly to the one which modifies the first example shown in FIG. 1, showing an example in which the changer over between simultaneous sound recording photographing and silent photographing can be done automatically by using the change in external shape of the film cartridge, while the change over is done by manual operation. In this drawing, members with the same numbers as those of the members shown in FIG. 1 to FIG. 5 and in FIG. 9 have the same function, therefore explanation of such members will be omitted. Also, while the cartridge 1' shown in FIG. 6 shows external shape of the sound film cartridge shown in FIG. 2, the cartridge 1 above imagination line shows a silent film cartridge shown in FIG. 1 for picture image recording only. 56' is a rotation disk corresponding to the rotation disk 56 shown in FIG. 5, and the rotation disk 56' has arms 56'a and 56'b extending in two arms fork shape and is engaged rotatably with the lever 55 at the continuation crest of said two arms fork. 65 is a spring one end of which is engaged with the pin 66 planted on the camera main body, and the other end of which engaged with one arm 56'b of the rotation disk 56', and the spring 65 is to bias the rotation disk 56' in a counter-clockwise direction so that the pin 57 is normally placed at the above mentioned second position at which it can engage with the bent part 42'b. 62 is a cartridge type detection member to detect the shape signal of film cartridges which are made with different shapes for different types of films housed, for controlling the above mentioned rotation disk 56', and the detection member 62 detects the loading of the sound film cartridge 1' when for example as shown in FIG. 6 the cartridges are different in their external shapes as in the silent film cartridge 1 shown in FIG. 1 and the sound film cartridge shown in FIG. 2. The cartridge type detection member 62 is rotatable around the axle 63 fixed to the main body 63, being always biased by spring 64 in a counter-clockwise direction, and at the same time a cartridge detection part 62a which can come into and out of the cartridge chamber engages with one end of the member 62, while an arm 56a of the above mentioned rotation disk 56' engaged with the other end. Also, the conventional circuit shown in FIG. 9 is applied to the second example shown in FIG. 6.

The function of the second example of the release mechanism of a motion picture camera according to the present invention having set-ups mentioned above will be explained using FIG. 6 and FIG. 9. FIG. 6 shows a state in which the sound film cartridge 1' of FIG. 2 is loaded. First, explanations will be made in a case when the silent film cartridge 1 is loaded within the cartridge chamber to conduct silent photographing. In the state where the silent film cartridge 1 is loaded, the detection part 62a of the cartridge detection member 62 is not in contact with the silent film catridge 1, and is in a state where it proceeds into the cartridge chamber. That is, the detection member 62 is rotatingly shifted in a counterclockwise direction using the axle 62 as its fulcrum. Therefore, the rotation disk 56' is also rotatingly shifted in a counterclockwise direction and the pin 57 is placed at a position to contact the bent part 42'a of the stop lever 42', and at the same time, as the operation lever 39' is slidingly shifted to the left end in the drawing the pinch roller 37 and the capstan 34 are in a separated state.

When external force is given to the release button 38' from a direction of an arrow A in the drawing after making the main switch 60 ON in this state, the shaft 55 is guided by the metal 54, and the stop lever 42' is rotted in a counterclockwise direction by the pin 57 planted on the rotation disk 56 against the biasing force of the spring 44 to clockwise direction. By this gear the engagement between the notched part 16 A of the gear 16 and the stopper part 42'b of the stop lever 42' is released and at the same time the switch 45 is made ON to initiate the first motor 14, thus feeding of photographing film is started. On the other hand, as the operation lever 39' does not receive the action of the pin 57, retaining the state of FIG. 5, the switch 53 is in OFF state and the pinch roller 37 is in a state not being engaged with the capstan 34. That is, a camera is initiated in a state suitable for silent photographing.

Then, as the sound film cartridge 1' as shown in FIG. 2 is loaded into the cartridge chamber instead of the silent film cartridge 1 for conducting simultaneous sound recording photographing, the detection part 62a of the cartridge detection member 62 is pushed out of the cartridge chamber by the cartridge 1' as the sound film cartridge 1' is loaded. At this time, the cartridge detection member 62 is rotatingly shifted in a clockwise direction against the biassing power of the spring 64, using the axle 63 as fulcrum. When the cartridge detection member 62 is rotatingly shifted in a clockwise direction the rotation disk 56' is rotatingly shifted by the cartridge detection part 62a to a position at which the pin 57 comes in contact with the bent part 39'c of the operation lever 39'. As external force is given to the release button 38' from a direction of the arrow A in the drawing, the shaft 55 is guided by the metal 54 and the operation lever 39' is slidingly shifted in the right direction in the drawing by the pin 57 planted on the rotation disk 56 against the biassing force of the spring 41 to left direction in the drawing. As the operation lever 39' is slidingly shifted, in the same manner as explained for FIG. 5, the switches 45, 53 are made ON, and the first motor 14 and the second motor 29 rotate so that action of the film constant speed mechanism and the film feeding mechanism is started.

Figure 7:
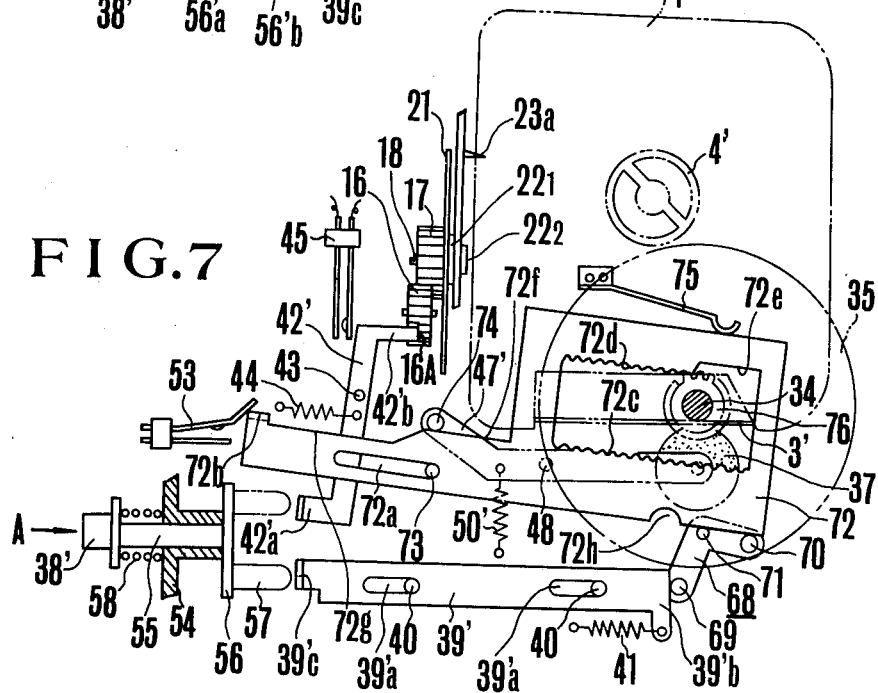
FIG. 7 is a plan view to show a motion picture camera allowing simultaneous sound recording according to the present invention, especially a third example of its release mechanism in detail, showing a state in which release initiation has not been made yet.

FIG. 7 is a plan to show in detail a third example of a motion picture camera allowing simultaneous sound recording according to the present invention, particularly to its release mechanism. In this drawing, members having the same numbers as those in FIG. 1 to FIG. 6 and in FIG. 9 have the same functions, thus explantion thereof will be omitted. In the drawing, 68 is a two arm fork lever axially supported at the axle 71 fixedly provided at the camera main body 13 in a rotatable manner, and pins 69, 70 are planted on each arm of the two arm form lever 68. 72 is a control member having at its part a long groove 72a, a projection 72b, rack parts 72c, 72d, a rack notch part 72c, cam parts 72f, 72g, and a concave part 72h, and the control member 72 is engaged with the axle 73 fixedly provided at the camera main body 13 with its long groove 72a so that it can rotate around said axle 46 and can slide to left and right directions, and when no external force is working on the release button 38' to direction of arrow A, the member 72 is shifted to the left end in the drawing to place the switch 53 of the circuit for the second motor 29 in OFF state. 47' is an arm corresponding to the pinch roller arm 47 shown in FIG. 4, FIG. 5, FIG. 6, and the arm 47' can rotate around the axle 48 fixed on the camera main body 13 and has a pin 74 at its other end being always biassed in a counter-clockwise direction by spring 50'. 75 is a sheet spring to always bias the control member 72 in a clockwise direction around the axle 73, and the sheet spring 75 is fixed on the camera main body 13. 76 is a gear fixed at the axle of the capstan 34 and the gear 76 is in an engageable and disengagable relationship with the above mentioned rack parts 72c, 72d.

The function of the third example of the release mechanism of a motion picture camera according to the present invention will be explained referring to FIG. 7 and FIG. 9. In a state shown in FIG. 1, the sound film cartridge 1' shown in FIG. 2 is loaded and the pin 57 of the rotation disk 56 is placed at a position corresponding to the bent part 39'c of the operation lever 39'. When external force is given to the release button 38' in a direction of the arrow A in the drawing after making the main switch 60 ON from the state, the shaft 55 is guided by the metal 54 and the pin 57 planted on the rotation disk 56 presses the operation lever 39' in the right direction in the drawing, so that the operation lever 39' is slidingly shifted in the right direction in the drawing against the biassing force of the spring 41 in the left direction in the drawing. When the operation lever 39' is slidingly shifted to end part 39'b of the operation lever 39' presses the pin 69 planted on the two arm form lever 68, therefore the fork lever 68 is rotatingly shifted in a counter-clockwise direction using the axle 71 as fulcrum. As the two arm lever 68 is rotatingly shifted, the control member 72 engaging with the pin 70 planted on the two arm lever 68 is rotated in a counter-clockwise direction using the axle 73 as fulcrum and the gear 76 and the rack part 72c are placed in an engaged relationship and at the same time it engages with the switch 53, and the projection 72b making said switch 53 OFF is separatd from the switch 53 to place the switch 53 in the ON state and to start the motor 29. By thus, the capstan 34 starts rotation in a counter-clockwise direction, and, since the gear 76 and the rack 72c are in engaged state, the control member 72 is slidingly shifted in the right direction in the drawing. By this, the pin 74 of the pinch roller arm 47' being positioned on the cam part 72f of the control member 72 comes to the position of the cam part 72g, therefore said pinch roller arm 47' rotates in a counter-clockwise direction around the axle 48, thereby the pinch roller 37 comes in pressure contact with the capstan 14 holding the film 3' therebetween. By this, while the film 3' is to be sent in the right direction in the drawing by the pinch roller 37 and the capstan 34, since the intermittent film advancing at photographing part is still in a stopped state at this time, the film 3' is being slipped between the capstan 34 and the pinch roller 37. As the control member 72 is further slided to the right direction from the first state, the projection 72b rotates the stop lever 42' in a counter-clockwise direction around the axle 43. By this, the stop lever 42'b comes apart from the notched part 16A of the gear 16 and the switch 45 of the first motor driving circuit is made ON therefore the intermittent film advancing mechanism, 16, 17, 22, 23 starts feeding of film. By this, both the intermittent film advancing for photographing and film advancing by the capstan 43 and the pinch roller 37 for sound recording are actuated, conducting the simultaneous sound recording photographing. Also, when the projection 72b of the above mentioned control member 72 actuates the stop lever, the concave part 72h of the control member 72 comes to the position of the pin 70 of the bell crank, therefore, the control member 72 rotates in a clockwise direction around the axle 73 as much as the dropped dimension of the concave part 72h. By this the rack part 72c of the control member 72 is separated from the gear 76 of the capstan 34, therefore, the control member 72 stops sliding. In this state, the pinch roller 37 holds it pressure contact with the capstan 34 and the pin 70 of the bell crank 68 and the concave part 72h of the control member 72 are engaged to each other, blocking the movement of the control member 72 in the left direction by returning power of the spring 44 of the stop lever 42'. Therefore, the state of simultaneous sound recording photographing is retained. Next, as the operation lever 39' is returned in the left direction by the spring 41 as a finger is removed off the release button 38' at the time when photographing is stopped, the bell crank 68 is rotated in a clockwise direction and the control member 72 rotates in a clockwise direction along with the rotation. By this the rack part 72d of the control member 72 engages with the gear 76 of the capstan 34. Since the rack part 72d is provided at a position which faces the rack part 72c with the gear 76 intervening there between. the control member 72 is shifted in the left direction while the gear 76 is rotated in the direction of the arrow. By sliding of the control member 72 the projection 72h actuating the stop lever 42' is separated again from the stop lever 42', therefore the stop lever 42' returns by the spring 44 and engages with the notched part 16A of the gear 16 to block intermittent feeding of the film 3' and to place the switch 45 in OFF state. On the other hand, the pin 74 of the pinch roller arm 47' making the pinch roller 37 to pressure contact with the capstan 34 comes over the cam part 72f again from the cam part 72g, therefore the pinch roller 37 is separated from the capstan 34. The projection 72b makes the switch 53 OFF at the final end of leftward sliding of the control member 72 to stop the second motor 29 driving the capstan and the gear 76 is disengaged from the engagement with the rack part 72d by the notched part 72e of the rack, thus the operation thereof is stopped, returning to the state of FIG. 7.

While explanations have been made above for a case when the sound film cartridge 1' is loaded to conduct simultaneous round recording photographing, now explanations will be made for the case when the silent film cartridge 1 is loaded to conduct silent photographing. When silent photographing is done, the pin 57 of the rotation disk 56 is separated from the bent part 39'c of the operation lever 39' and is placed at such position as facing the bent part 42'a of the stop lever 42'.

When external force is given to the release button 38' from a direction of arrow A in the drawing after making the main switch 60 ON in the state, the shaft 55 is guided by the metal 54 and the stop lever 42' is rotated in a counter-clockwise direction by the pin 57 planted on the rotation disk 56 against the biasing power of the spring 44 in a clockwise direction, releasing the engagement between the notched part 16A of the gear 16 and the stopper part 42'b of the stop lever 42', then the switch 45 is made ON and the first motor 14 is actuated starting the feeding of photographing film. On the other hand, since the operation lever 39' does not receive the action by the pin 57 and retains the state of FIG. 7, the switch 53 is placed in OFF state and the pinch roller 37 is kept in a state not engaging with the capstan 34, thus a camera is initiated in a state suitable for silent photographing. While change over of the release action between simultaneous sound recording and silent is done by the rotation of the release button 38' using the shaft 55 as its axis in the example shown in FIG. 7, it may be done by providing other change over means (for example a change over knob operated from outside of a camera) as explained in the first example explained in FIG. 5.

Figure 8:
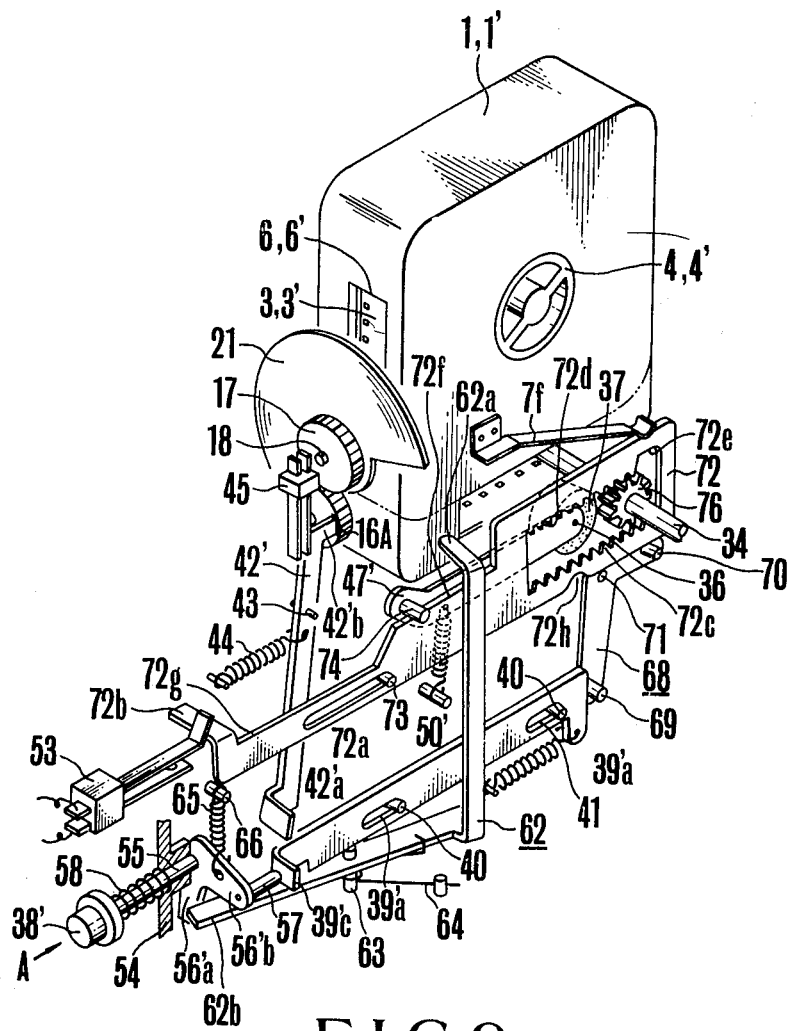
FIG. 8 is an oblique view to show a motion picture camera allowing simultaneous sound recording according to the present invention, especially to a fourth example of its release mechanism, showing a state in which the sound film cartridge shown in FIG. 2 is loaded but release initiation has not been made.

FIG. 8 is an oblique view shownning in detail a fourth example of a motion picture camera allowing simultaneous sound recording according to the present invention especially to the one modifying the third example shown in FIG. 7, wherein change over between simultaneous sound recording photographing and silent photographing is done automatically using the difference in external shape of film cartridges while the change over is done by manual operation in the third example shown in FIG.7. In this drawing, members having the same numbers as those of the members in FIG. 1 to FIG. 7 and in FIG. 9 have the same functions, therefore explanation thereof will be omitted. The cartridge 1' shown in FIG. 8 indicates external shape of the sound film cartridge shown in FIG. 2, while the cartridge 1 above the imaginary line shows the silent film cartridge for picture image recording only shown in FIG. 1.

The function of the fourth example of the release mechanism of a motion picture camera according to the present invention shown in FIG. 8 will be explained using FIG. 8, FIG. 9. FIG. 8 shows a state when the sound film cartridge 1' shown in FIG. 2 is loaded. Therefore, first explanations will be made on a case when the sound film cartridge 1' is loaded in the cartridge to conduct simultaneous sound recording photographing recording picture image and sound simultaneously. Now, when none of the cartridges are loaded in the cartridge chamber, the cartridge detection member 62 is rotatingly shifted in a counterclockwise direction using the axle 63 as fulcrum by the rotating biassing power in a counter-clockwise direction by spring 64 and the detection part 62a is in a state projecting out into inside of the cartridge chamber. On the other hand, as the cartridge detection member 62 is shifted in a counter-clockwise direction the bell crank 68' is rotatingly shifted in a counterclockwise direction by the counter-clockwise biasing power of the spring 65, placing the pin 57 at such position as facing the bent part 42'b of the stop lever 42.

When a sound film cartridge 1' as shown in FIG. 2 for example is loaded into the cartridge chamber in the state, the detection part 62a of the cartridge detection member 62 comes in contact with the cartridge 1' and is pushed out from the cartridge chamber. At this time, the cartridge detection member 62 is rotatingly shifted in a clockwise direction using the axle 63 as fulcrum against the biasing power of the spring 64. As the cartridge detection member 62 is rotatingly shifted in a clockwise direction, the bell crank 56' is rotatingly shifted by the cartridge detection member 62a in a clockwise direction to such a position that the pin 57 and the bent part 39'c of the operation lever 39' come in contact to each other, thus the state shown in FIG. 8 is realized. When external force is given to the release button 38' in the direction from the arrow A in the drawing in the state the shaft 55 is guided by the metal 54 and the operation lever 39' is slidingly shifted in the right direction in the drawing by the pin 57 planted on the rotation disk 56 against the biasing power of the spring 41 to the left direction in the drawing. As the operation lever is slidingly shifted, similar action, as explained for the third example shown in FIG. 7, is initiated, and the constant speed film running mechanism, the intermittent film feeding mechanism and the sound recording mechanism are activated.

When simultaneous sound recording photographing on to the sound film cartridge is thus completed and the cartridge is taken out of the film chamber, the cartridge detection member 62 is rotatingly shifted in a counter-clockwise direction using the axle 63 as fulcrum by biasing power of the spring 64. As the cartridge detection member 62 is rotatingly shifted in a counter-clockwise direction, the bell crank 56' is rotatingly shifted by the biasing power of the spring 65 in a counterclockwise direction using the shaft 55 as fulcrum to such position that the pin 57 and the bent part 42'b of the stop lever 42' come in contact with each other.

Next, as a silent film cartridge as shown in FIG. 1 for example is loaded into the cartridge chamber, the silent film cartridge is shorter than the sound film cartridge in one direction of its form as explained in FIG. 2. Therefore, even when the silent film cartridge 1 is loaded the detection part 62a of the cartridge detection member 62 does not contact the cartridge 1 and is left in a state preceeding into the inside of the cartridge chamber. Therefore, when external force is given to the release button 38' in the direction from the arrow A in the drawing after making the main switch ON in the state, the shaft 55 is guided by the metal 54, and the stop lever 42' is rotated in a counter-clockwise direction by the pin 57 planted on the rotation disk 56 against the biasing power of the spring 44 to clockwise direction. By this, the engagement between the notched part 16A of the gear 16 and the stop part 42'b of the stop lever 42' is released and the motor 45 is made ON to initiate the first motor 14, starting feeding of photographing film. On the other hand, since the operation lever 39' does not receive action of the pin 57, the switch 53 is kept in OFF state and the pinch roller 37 is left in a state not contacting the capstan 34. That is, a camera is initiated in a state suitable for silent photographing.

As has been explained, according to the first to fourth examples of the present invention, change over can be made selectively so that a mechanism necessary for sound recording is actuated only when simultaneous sound recording photographing is done while it is not actuated when silent photographing only is done. Therefore, comparatively heavy operating power for the release button required to operate the operation lever 39' is needed only for simultaneous sound recording photographing. Thus, the release button can be operated, with very light touch at the time of silent photographing. Furthermore, power supply to the sound recording means not required for silent photographing is cut off in silent photographing, thus saving power consumption. Also in the example 2, and example 4, in addition to the effect just mentioned, there is such effect that the loading of the sound film cartridge or the silent film cartridge is detected to automatically change over the photographing mode to the sound photographing mode as well as the silent photographing mode, thus failure of forgetting the change over can be prevented. Also in the third and fourth examples, further, in addition to the above mentioned effect, there is such effect that when the sound film cartridge is loaded to conduct simultaneous sound recording photographing, the force required for a photographer for release operation may be only such force as engaging the rack part 37c to the gear 44, while the pressure contacting action of pinch roller against capstan and shutter release action is done by the control member 72 using the second motor as its power, thus only very light power is needed as compared a to conventional type camera.

While the detection method for the type of cartridge of the cartridge detection member 62 shown in examples 2 and 4 is to detect the external dimension and size of the cartridge, for example such a method may be employed that a concave part is provided at the main body of the silent film cartridge while it is not provided in the sound film cartridge, so that when the silent film cartridge is loaded into the cartridge chamber, the detection part 62a of the cartridge detection member 62 is made to come into the concave part, thereby preventing the detection part 62a from being pushed out to outside of the cartridge chamber, and only when the sound film cartridge without the concave part on the surface of its main body is loaded the detection part 62a is pushed out to outside of the cartridge chamber, thus the loading of the sound film cartridge or silent film cartridge is automatically detected, thus the present invention is not to be limited to a case when the film cartridge shown in FIG. 2 is used.

Also, while the cartridge detection member 62 in the second and fourth example of the present invention directly rotates and controls the bell crank 56' with a part of the member 62 as the type of cartridge is detected, it is also possible that for example a controllable electromagnet is provided functionally together with the bell crank 56' and a switch to control magnetizing and demagnetizing of the electromagnet is provided in an associated relationship with the cartridge detection member 62, so that when the cartridge detection member detects the sound film cartridge 1' the switch is made ON or OFF to place the electromagnet in a magnetized or demagnetized state to control the bell crank 56'.

What is claimed is:

1. A motion picture camera capable of having a strip of silent film being able to record picture image information only and a strip of sound film being able to record picture image information and sound information selectively loaded thereinto, comprising:
    a first transport means which contributes to the transporting of said film to a picture formable position of a picture image forming means;
    a sound recording head capable of recording sound information on a sound film when said film is loaded;
    a second transport means having a capstan rotatable about a fixed axis and a movable pressure roller capable of shifting between a position to engage with said capstan and a position to disengage therefrom, said transport means being so positioned as sandwiching a running path of said sound film which passes through a position adjacent to said sound recording head, and capable of running the sound film on the running path which passes through near the sound recording head by pressing the pressure roller against the capstan; and
    a control means to control said film transport means by the first transport means and the second transport means, said control means comprises:
        a. a release means which can be handled from outside of the camera and can be shifted to (1) a first position to activate the camera and to (2) a second position to stop the operation of the camera, b. a first actuating means to control the actuation of the first transport means and the stopping thereof, said first actuating means being able to be shifted to (1) a first position at which said actuating member is placed as the release means is positioned at its first position to put the first transport means in an operative state and to (2) a second position at which said actuating member is placed as the release member is positioned at its second position to put the first transport means in an inoperative state, in association with the shifting of the release means, c. a second actuating means to control the shifting of the pressure roller, wherein said actuating means can be selectively shifted to a first position at which the pressure roller engages with the capstan and to a second position at which it disengages from the same, and d. a mode change-over means to selectively establish the associating relationship between the release means and the second actuating means so that the second actuating means is shifted to its first position when the release member is placed at its first position, while the second actuating means is shifted to its second position when the release means is placed at its second position, wherein said changeover means can be shifted to a first position at which it is located between the release means and the second actuating means wherein the associated relationship is formed and to a second position at which it is placed outside of the space between the release means and the second actuating means wherein said associated relationship is released;

whereby, at the time when the silent film is loaded, the mode change-over means is placed at its first position, while said mode change-over means is placed at its second position when the sound film is used.

2. A camera according to claim 1, in which the mode change-over means is placed between the release means and the first actuating means as it is placed at its second position to independently establish the associating relationship between the release means and the first actuating means, and the second actuating means and the first actuating means are mechanically linked so that when the mode change-over means is placed at its first position and the second actuating means is shifted to its first position receiving the shifting power of the release means it is associated with the second actuating means and the first actuating means is shifted to its first position, while when the second actuating means is shifted to its second position, the first actuating means is also shifted to its second position.

3. A camera according to claim 2, in which said mode change-over means is provided on a rotatable release member of the release member and is shifted to the first position and the second position by rotating around said release member using the release member as an axis.

4. A motion picture camera comprising:
a housing having a cartridge chamber into which either (1) a silent film cartridge housing a strip of film being able to record picture image information only, or (2) a sound film cartridge housing a strip of film being able to record picture image information and sound information and having a portion protruding further outside the cartridge than the silent film cartridge, can be selectively loaded, and which one side wall of said chamber has a perforated hole for detecting cartridge type, said hole in said wall being covered with said protruding part of said sound film cartridge when said cartridge is loaded and not being covered with the silent film cartridge when said cartridge is loaded;

a means to record picture image information on the film loaded into said cartridge chamber;

a first transport means which contributes to transport the film to a picture image formable position of the picture forming means;

a sound recording head which can record sound information on the film within the sound film cartridge when said cartridge is loaded;

a second transport means having a capstan rotatable about a fixed axis and a movable pressure roller capable of being shifted to a position to engage with said capstan and to a position to disengage with the same, being respectively positioned to sandwich a running path of said sound film which passes through the sound recording head, and being able to run the sound film on said running path which passes through the sound recorded head by pressure contacting the pressure roller with the capstan; and a control means to control said film transport of the first transport means and the second transport means, in which said control means includes;
  a. a release means which can be handled from outside of a camera and can be shifted to (1) a first position to actuate said camera and to (2) a second position to stop the action of the camera,
  b. a first actuating means to control the actuation and stopping of said first transport means, wherein said actuating means can be shifted in an association with the shifting of the release means to (1) a first position at which it is placed when the release means is located at its first position to put the first transport means in an operable state and to (2) a second position at which it is placed when the release means is located at its second position to put the first transport means in an operable state,
  c. a second actuating means to control the shifting of the pressure roller, wherein said actuating means can be selectively shifted to a first position at which the pressure roller engages with the capstan and to a second postion at which said roller disengages from the capstan,
  d. a mode change-over means to selectively establish the associating relationship between the release means and the second actuating means so that the second actuating means is shifted to its first position when the release means is located at its first positioned while the second actuating means is shifted to its second position when the release means is located at its second position, wherein said change-over means can be shifted to a first position located between the release means and the second actuating means to form an associated relationship and to a second position located outside of the space between the release means and the second actuating means to release said associated relationship,
  e. a detector having a detecting portion located within a cartridge type detection perforated hole of the cartridge chamber for detecting the type of the film cartridge loaded into said cartridge chamber and a controlling portion to control the mode change-over means, wherein said detector can be selectively shifted to (1) a first position at which the detecting portion protrudes from the perforated hole of the cartridge chamber into the cartridge chamber at the same time the controlling portion holds the mode change-over means at its second position, and to (2) a second position at which the detecting portion retracts itself from the cartridge chamber at the same time the controlling portion holds the mode change-over means at its first position, and f. an urging means to bias the detector to the direction of the first position;

whereby when the sound film cartridge is loaded into the cartridge chamber, the detecting portion is retracted to outside of the cartridge chamber against the biasing power of the urging means by such portion of the detecting portion as contributes to the formation of the sound recording opening of the sound film cartridge and the detector is shifted from the first position to the second position.

5. A camera according to claim 4, in which the mode change-over means is placed between the release means and the first actuating means as it is placed at its second position to independently establish the associated relationship between the release means and the first actuating means, and the second actuating means and the first actuating means are so mechanically linked that when the mode change-over means is placed at its first position and the second actuating means is shifted to its first position receiving the shifting power of the release means, it is associated with the second actuating means and the first actuating means is shifted to its first position, while when the second actuating means is shifted to its second position the first actuating means is also shifted to its second position.

6. A motion picture camera into which (1) a silent film capable of recording picture image information only and (2) a sound film having a sound recording zone at its position and capable of recording picture image information and sound information on the same film can be selectively loaded, wherein the improvement comprises;

a. a driving means;
b. a picture image forming means;
c. a first transport means to transport said selectively loaded film to a picture image formable position of the picture image forming means, being actuated by receiving the driving force of the driving means;
d. a sound recording means to record sound information on the sound recording zone of the film in association with the recording of picture image information on the film by the picture image forming means when the sound film is loaded;
e. a second transport means to transport the film with an almost constant speed at a sound signal recordable position of the sound recording means when the sound film is loaded, wherein said transport means has a capstan member rotated by receiving the driving force of the driving means and a freely rotatable pinch roller means at such opposing positions for sandwiching the running path of the sound film, and one member from said capstan member and the pinch roller member can be selectively shifted to (1) a first position at which each member is in mutually pressure contacting relationship and being able to transport the film and to (2) a second position at which the distance between said member is largely separated placing the film in a free state between the capstan member and the pinch roller member; and f. a release means to control the initiation of the driving means and the shifting of the movable member of the second transport means, having
  1. a release member which can be handled from outside of a camera, being able to be selectively shifted to a first position to hold the driving means in a driving state and to a second position to hold the same in a non-driving state,
  2. an actuating means to control the shifting of the movable member of the second transport means, wherein said actuating means is activated by receiving the shifting action of the release member, and, when the release member is at its first position, the movable member of the second transport means is retained at its first position, while when the release member is at its second position, the movable member of the second transport means is retained at its second position, and
  3. a mode change-over means to selectively release the associating relationship between the release member and the actuating member, wherein said change-over means is located between the release member and the actuating means and can be selectively shifted to a first position at which the functional relationship between the release member and the actuating means is cut off and to a second position at which said functional relationship is formed;

whereby the mode change-over means is located at its first position when the silent film is loaded, while the mode change-over means is located at its second position when the sound film is loaded, so that the handling power for handling the release member from outside of a camera can be made small when the silent film is used.

7. A camera according to claim 6, in which the capstan member of the second transport means is placed at a prescribed position in an unshiftable manner, and the pinch roller member is controlled by the actuating member and is shifted to the first position and the second position.

8. A camera according to claim 6, in which the sound recording means has at almost opposing positions for sandwiching the running path of the sound film;
  1. a transducing head means which can record the sound information on the sound recording zone of the sound film, and
  2. a pad member for contacting the film with the transducing means so as to enable the transducing head means to record the sound information on the sound film in a desired manner, wherein said pad member is mechanically linked with the actuating means and can be selectively shifted to (I) a first position at which it comes into a pressure contacting relationship with the transducing head means in an association with the holding of the movable member of the second transport means by the actuating means at its first position, thus holding the sound film together with the transducing head means and to (II) a second position, at which, when the actuating means holds the movable member of the second transport means at the second position thereof, the distance between itself and the transducing head means being largely separated in association with said holding action of the actuating means placing the film in a free state between the transducing head means and the pad means.

9. A motion picture camera to which (1) a silent film capable of recording picture image information only and (2) a sound film capable of recording picture image information and sound information on the same film can be selectively loaded, the improvement comprising:
   a. a control means to control the initiation and stopping of the camera, being able to be handled from outside of the camera and shifted to a first position to activate the camera and to a second position to stop the activation of the camera;
   b. a first driving means;
   c. a first switch for supplying the current supply to the first driving means;
   d. a first transport means to transport said selectively loaded film to a picture image formable position of the picture image forming means, being actuated by receiving the driving force of the first driving means;
   e. a rotary shutter means to selectively shield the light from an object incident to the picture image formable position, wherein said shutter means is positioned between the picture image forming means and the film running path and is rotatingly operated receiving the driving force of the first driving means;
   f. a first actuating means having at least a blocking portion to engage with the rotary shutter means and to block the rotating action of said rotary shutter means and a controlling portion to control the opening and closing of the first switch, wherein said actuating means is associated with the shifting of the control means and can be selectively shifted to (1) a first position at which it is placed when the control means is located at its second position and the blocking portion is placed in an engaging state with the rotary shutter means at the same time the controlling portion places the first switch in an opened state and to (2) a second position at which it is placed when the control means is placed at its first position and the blocking portion is placed in disengaged state with the rotary shutter means so as to allow the rotation of the rotary shutter means, said controlling portion at the same time placing the second switch in a closed state;
   g. a sound recording means to record sound information on the sound recording zone of the sound film in association with the recording of picture image information on said film by the picture image forming means when said film is loaded;
   h. a second driving means;
   i. a second switch for supplying current to said second driving means;
   j. a second transport means to transport the sound film with an almost constant speed to a sound signal recordable position of the sound recording means when said film is loaded, wherein said transport means has a capstan rotated by receiving the driving force of the second driving means and a freely rotatable pinch roller at almost opposing positions sandwiching the running path of the sound film, said pinch roller being selectively shifted to (1) a first position at which it comes into pressure contacting relationship being able to transport film and to (2) a second position at which the distance between the pinch roller and the capstan is largely separated to place the film in a free state between the capstan and the pinch roller;
   k. a second actuating means which controls the shifting of the first actuating means, the opening and closing of the second switch and the shifting of the pinch roller, wherein said actuating means is associated with the shifting of the control means and can be selectively shifted to (1) a first position at which it is placed when the control means is located at its second position and the first actuating means is held at its first position while the second switch is held at an opened state and the pinch roller is held at its second position, and to (2) a second position at which it is placed when the control means is located at its first position and the first actuating means is held at its second position while the second switch is held at the closed state and the pinch roller is held at its first position;
   l. a mode change-over means to change over the channel by which the shifting power of the control means works on the first actuating means, wherein said change-over means can be handled from outside of the camera and can be selectively shifted by said handling to (1) a first position placed between the control means and the first actuating means to have the shifting of the control means directly work on the first actuating means and to (2) a second position placed between the control means and the second actuating means to have the above-mentioned shifting of the control means work on the first actuating means through the second actuating means;
   whereby, when the silent film is loaded, the mode changeover means is placed at its first position, while when the sound film is loaded, the mode change-over means is placed at its second position so that the handling power to handle the control means from outside of the camera when the silent film is used is made small.

10. A camera according to claim 9, in which the mode change-over means is provided on the rotatable control member of the control means, and is shifted from its first position to the second position by rotating around the control member using the same as axis.

11. A motion picture camera having a cartridge chamber into which (1) a silent film cartridge having an exposure opening formed therein and housing a roll of photographic film which runs through said exposure opening and can record picture image information only and (2) a sound film cartridge having an exposure opening and a sound recording opening formed thereon and housing a roll of photographic film which runs through said exposure opening and said sound recording opening and has a sound recording zone capable of recording picture image information and sound information, and further having an identification part with different shape from that of the silent film cartridge provided at the outside thereof to distinguish the same from the silent film cartridge, can be selectively loaded, and having a cartridge type detection hole formed thereon at such position of a side wall of the chamber which corresponds to said cartridge identification part when said cartridge is loaded, the improvement comprising:
   a. a picture image forming means to form a picture image formable position on the film running path which runs on the exposure opening of the film cartridge selectively loaded into the chamber;

b. a first transport means to transport the film in the film cartridge being selectively loaded into the chamber within the running path of film at the exposure opening;

c. a sound recording means having a transducing head means positioned near the film running path operating within the sound recording opening of the cartridge when the film cartridge is loaded into the cartridge chamber;

d. a second transport means to transport the film with almost constant speed within the film running path at the sound recording opening of the cartridge when the sound film cartridge is loaded into the chamber, wherein said transport means has a capstan and a pinch roller at such opposing positions for sandwiching the film running path at the sound recording opening of the cartridge when the sound film cartridge is loaded, and at least one out of said capstan and pinch roller can be selectively shifted to (1) a first position so as to have both disposed in mutually pressure contact with each other for being able to transport the film and to (2) a second position at which the distance therebetween is largely separated to position the film in a free state between the pinch roller and the capstan, e. a control means to control the initiation and stopping of the camera, having:
  1. a release means which can be handled from outside of the camera and can be selectively shifted to a first position to hold the camera in an operative state and to a second position to hold the same in an inoperative state,
  2. an actuating means to control the shifting of the movable one out of the capstan and the pinch roller, wherein said actuating means is activated by receiving the shifting action of the release means to (A) hold the movable element of said capstan and pinch roller at its first position when the release means is at its first position and to (B) hold the movable element of said capstan and pinch roller at its second position when the release means is at its second position, and
  3. a mode change-over means to selectively release the functional relationship between the release means and the actuating means, wherein said change-over means is positioned between the release means and the actuating means and can be selectively shifted to a first position to cut off the functional relationship between the release means and the actuating means and to a second position to establish said functional relationship, and f. a detector having a detecting portion positioned at the detection hole of the cartridge chamber to detect the type of film cartridge loaded into the cartridge chamber and a controlling portion to control the mode change-over means, wherein said detector detects the identification part of the film cartridge loaded into the cartridge chamber with its detecting portion and can be selectively shifted to (1) a first position at which the controlling portion holds the mode change-over means at its second position as the sound film cartridge is detected and to (2) a second position at which the controlling portion holds the mode change-over means at its first position as the silent film cartridge is detected.

12. A camera according to claim 11, in which the capstan of the second transport means is so positioned as being unable to be shifted to a prescribed position, while the pinch roller is controlled by the actuating means and can be shifted to its first position and second position.

13. A camera according to claim 11, in which the transducing head means has at such mutually opposing positions which sandwich the film running path for sound recording opening;
  1. a magnetic head to record sound information on the sound recording zone of the film, and
  2. a pad member for contacting the film with the head so as to enable the head to record the sound information on the sound film in a desired manner, wherein said pad memger is mechanically linked with the actuating means and can be selectively shifted to (I) a first position at which it comes in pressure contacting relationship with the head in association with the holding action by the actuating means of the movable element from the capstan and the pinch roller at its first position to sandwich the film between itself and the head, and to (II) a second position at which the distance between itself and the head is largely separated in association with the holding action by the actuating means of the movable element of the capstan and pinch roller at its second position to place the film in a free state between the head and pad member.

14. A motion picture camera having a film cartridge chamber into which:
  1. a silent film cartridge having an exposure opening formed thereon and housing a roll of photographic film which runs through said exposure opening and can record picture image information only, and
  2. a sound film cartridge having an exposure opening and a sound recording opening formed thereon, at the same time housing a roll of photographic film which runs through said exposure opening and sound recording opening and has a sound recording zone at its portion and also can record picture image information and sound information, which further, as its external shape is compared with that of said silent film cartridge, having a part contributing to the formation of the sound recording opening protruding more than a corresponding part of the silent film cartridge, can be selectively loaded, wherein the improvement comprises:

a. that said cartridge has a cartridge type detection perforated hole formed at such position on its side wall as would be covered by the protruding part when the sound film cartridge is loaded and not being covered by the silent film cartridge when said cartridge is loaded;

b. a picture image forming means to form a picture image formable position on the film running path on the exposure opening of the film cartridge selectively loaded;

c. a first transport means to transport the film within the selectively loaded film cartridge in the film running path at the exposure opening;

d. a sound recording means which has a sound signal recordable position near the film running path within the sound recording opening of the cartridge at least when the sound film cartridge is loaded into said cartridge chamber;

a second transport means to transport the sound film with an almost constant speed on the film running path corresponding to the sound signal recordable position of the sound recording means when the sound film cartridge is loaded, wherein said transport means has a freely rotatable pinch roller and a capstan at opposing positions which sandwiches the film running path at the sound recording opening of the sound film cartridge when the sound film cartridge is loaded into the cartridge chamber, and wherein said pinch roller can be selectively shifted to (1) a first position at which it comes in a pressure contacting relationship with the capstan to be able to transport the film and to (2) a second position at which the distance between itself and the capstan is largely separated to place the film in a free state between itself and the capstan;

a control means to control the initiation of the camera and the shifting of the pinch roller, having:
1. a release means which can be handled from outside of the camera and can be shifted to a first position to hold the camera in a driving state and to a second position to hold the same in a non-operative state,
2. an actuating means to control the shifting of the pinch roller, wherein said actuating means functions by receiving the shifting action of the release means to (A) retain the pinch roller at its first position as the release means is at its first position and to (B) retain the pinch roller at its second position as the release means is at its second position, and
3. a mode change-over means to selectively release the functional relationship between the release means and the actuating means, wherein said change-over means is placed between the release means and the actuating means and can be selectively shifted to a first position to cut off the functional relationship between the release member and the actuating means and to a second position to establish said functional relationship;

a detector having a detecting portion positioned within the cartridge type detection perforated hole of the cartridge chamber to detect the type of the film cartridge loaded into the cartridge chamber and a controlling portion to control the mode change-over means, wherein said detector can be selectively shifted to (1) a first position at which the detecting portion protrudes from the perforated hole of the cartridge chamber into the cartridge chamber, at the same time the controlling portion holds the mode change-over means at its first position and to (2) a second position at which the detecting portion retracts itself from the cartridge chamber at the same time the controlling portion holds the mode change-over means at its second position; and an urging means to always bias the detector to the direction of its first position;

hereby, when the sound film cartridge is loaded into the cartridge chamber, the detecting portion is retracted to outside of the cartridge chamber by the part contributing to the formation of the sound recording opening of the sound film cartridge against the biasing power of the urging means, and the detector is shifted from its position to its second position.

15. A camera according to claim 14, in which the sound recording means has at mutually opposing positions for sandwiching the film running path of the sound recording opening:
1. a transducing head means to record the sound information on the sound recording zone of the film, and
2. a pad means for contacting the film with the transducing head means so as to enable the transducing head means to record the sound information on the sound film in a desired manner, wherein said pad means is mechanically linked with the actuating means and can be selectively shifted to (I) a first position at which it comes in pressure contacting relationship with the transducing head means in association with the holding action by the actuating means of the pinch roller at its first position, sandwiching the film between itself and the transducing head means, and to (II) a second position at which the distance between itself and the transducing head means is largely separated in an association with the action of the actuating means to place the pinch roller at its second position to place the film in a free state between the transducing head means and itself.

16. A motion picture camera having a film cartridge chamber into which:
1. a silent film cartridge having an exposure opening formed thereon and housing a roll of photographic film which runs through said exposure opening and can record picture image information only, and
2. a sound film cartridge having an exposure opening and a sound recording opening and housing a roll of photographic film which runs through said exposure opening and the sound recording opening and has a sound recording zone at its portion, further can record picture image information and sound information, and also as its external shape is compared with that of the silent film cartridge, having a portion contributing to the formation of the sound recording opening which protrudes to a greater extend than a corresponding portion of the silent film cartridge;

can be selectively loaded, wherein the improvement comprises:
a. that said cartridge chamber has a cartridge type detection perforated hole formed at such position at a side wall of the chamber as would be covered by the part contributing to the formation of the sound recording opening of the cartridge when the sound film cartridge is loaded, and which would not be covered by the silent film when said cartridge is loaded;
b. a picture image forming means to form a picture image formable position on the film running path which runs the exposure opening of the film cartridge selectively loaded;
c. a first driving means;
d. a switch means to control current supply to the first driving means;
e. a first transport means to transport the film within the loaded film cartridge in the film running path at the exposure opening, being actuated by receiving driving power of the first driving means;
f. a sound recording means which has a position for forming the film running path within the sound recording opening of the sound film cartridge as said cartridge is loaded into the cartridge chamber and at such opposing positions for sandwiching said film running path;
  1. a transducing head means to record sound information on the sound recording zone of the film, and
  2. a pad means for contacting the film with the transducing head means so as to enable the transducing head means to record the sound information on the sound film in a desired manner, wherein said pad means can be selectively shifted to (A) a first position at which it comes in pressure contacting relationship with the transducing head means to sandwich the film between itself and the head means, and to (B) a second position at which the distance between itself and the head means is largely separated to place the film in a free state between itself and the head means;
g. a second driving means;
h. a second transport means to run the film with an almost constant speed between the transducing head means and the pad means when the sound film cartridge is loaded; wherein said transport means has a freely rotatable pinch roller and a capstan rotated by receiving the driving power of the second driving means at almost opposing positions for sandwiching the film running path at the sound recording opening of the sound film cartridge when the sound film cartridge is loaded into the cartridge chamber, and said pinch roller can be selectively shifted to (1) a first position at which it comes in contacting relationship with the capstan to be able to transport the film, and to (2) a second position at which the distance between itself and the capstan is largely separated to position the film in a free state between itself and the capstan;
i. a release means to control the switch means, wherein said release means can be handled from outside of the camera and can be selectively shifted to (1) a first position to hold the switch in a closed state, and to (2) a second position to hold the same in an opened state;
j. an actuating means to control the above-mentioned shifting of the pad means and the shifting of the pinch roller, wherein said actuating means can be mechanically linked selectively with the release means and when so mechanically linked is shifted to (1) a first position to hold the pad means and the pinch roller at their first positions respectively in an association with the shifting of the release means to its first position, and to (2) a second position to hold the pad means and the pinch roller at their second positions respectively in an association with the shifting of the release means to its second position;
k. a mode change-over means to selectively set and release the mechanical link between the release means and the actuating means, wherein said change-over means is positioned between the release means and the actuating means and can be selectively shifted to a first position to establish the mechanical link between the release means and the actuating means and to a second position to release said mechanical link;
l. a detector having a detecting portion positioned within the cartridge type detection perforated hole of the cartridge chamber to detect the type of the film cartridge loaded into the cartridge chamber and a controlling portion to control the mode change-over means, wherein said detector can be selectively shifted to (1) a first position at which the detecting portion protrudes out of the perforated hole of the cartridge chamber into the cartridge chamber, at the same time the controlling portion holds the mode change-over means at its first position, and to (2) a second position at which the detecting portion retracts itself from the cartridge chamber, at the same time, the controlling portion holds the mode change-over means at its second position; and
m. an urging means to always bias the detector to the direction of its first position;
whereby, when the sound film cartridge is loaded into the cartridge chamber, the detecting portion is retracted to a position outside of the cartridge chamber by the part of the sound film cartridge contributing to the formation of the sound recording opening resisting the biasing power of the urging means, while the detector is shifted from its first position to its second position.

17. A motion picture camera having a film cartridge chamber into which:
  1. a silent film cartridge having an exposure opening formed thereon and housing a roll of photographic film which runs through said exposure opening and can record picture image information only, and
  2. a sound film cartridge having an exposure opening and a sound recording opening formed thereon and housing a roll of photographic film which runs through said exposure opening and the sound recording opening and has a sound recording zone, further can record picture image information and sound information, and as its external shape is compared with that of the silent film cartridge, having a part contributing to formation of the sound recording opening protruding to a greater extent than a corresponding portion of the silent film cartridge,
can be selectively loaded, the improvement therein comprising:
a. said cartridge chamber has a cartridge type detection perforated hole formed at the position on one side wall of the chamber as would be covered by said protruding part of the sound film cartridge when said cartridge is loaded and not being covered by the silent film cartridge when said cartridge is loaded;
b. a picture image forming means having a picture image formable position on the film running path on the exposure opening of the film cartridge selectively loaded;
c. a control means to control the initiation and stopping of the camera, being able to be handled from outside of the camera and to be shifted to a first position to actuate the camera and to a second position to stop the action of the camera;
d. a first driving means;
e. a first switch to control the current supply to said first driving means;
f. a first transport means to transport the film within the loaded film cartridge in the film running path at the exposure opening, being actuated by receiving the driving power of the first driving means;

g. a rotary shutter means to selectively shield the light beam from an object incident into the picture image formable position, wherein said shutter means is positioned between the picture image forming means and the cartridge chamber and rotatingly acts by receiving the driving power of the first driving means; 'h. a first actuating means having at least a blocking portion to engage with the rotary shutter means and to block the rotating action of the rotary shutter means and a controlling portion to control the opening and closing of the first switch, wherein said actuating means is associated with the shifting of the control means and can be selectively shifted to (1) a first position at which it is placed as the control means is placed at its second position, and the blocking portion is placed in engagement with the rotary shutter means, at the same time the controlling portion places the first switch in an opened state, and to (2) a second position at which it is placed when the control means is placed at its first position and the blocking portion is so placed in non-engagement state with the rotary shutter means as allowing the rotation of the rotary shutter means, at the same time the controlling portion places the second switch is a closed state;

i. a sound recording means, which has at least a sound signal recordable position near the film running path within the sound recording opening of the cartridge when the sound film cartridge is loaded into the film cartridge chamber;

j. a second driving means;

k. a second switch to control the current supply to the second driving means;

l. a second transport means to transport the film with an almost constant speed on the film running path corresponding to the sound signal recordable position of the sound recording means when the sound film cartridge is loaded, wherein said transport means has at least a freely rotatable pinch roller and a capstan rotated by receiving the driving power of the second driving means at opposing positions for sandwiching the film running path at the sound recording opening of the sound film cartridge when said sound film cartridge is loaded into said cartridge chamber, and said pinch roller can be selectively shifted to (1) a first position at which it comes into contacting relationship with the capstan being able to transport the film, and to (2) a second position at which the distance between itself and the capstan is largely separated to place the film in a free state between the pinch roller and the capstan;

m. a secondary actuating means for controlling the shifting of the first actuating means, the opening and closing of the second switch and the shifting of the pinch roller, wherein said actuating means is associated with the shifting of the control means and can be selectively shifted to (1) a first position at which it is placed when the control means is placed at its first position to retain the first actuating means at its first position, and the second switch at an open state and also the pinch roller at its second position, respectively, and to (2) a second position at which it is placed when the control means is located at its first position to retain the first actuating means at its second position, and the second switch at a closed state and also the pinch roller at its first position, respectively;

n. a mode change-over means to change over the channel through which the shifting power of the control means works on the first actuating means, wherein said change-over means can be selectively shifted to (1) a first position at which it is placed between the control means and the first actuating means to have said shifting of the control means directly operate on the first actuating means, and to (2) a second position at which it is placed between the control means and the second actuating means to have the shifting of the control means operate on the first actuating means through the second actuating means;

o. a detector having a detecting portion positioned within the cartridge type detection perforated hole of the cartridge chamber for detecting the type of the film cartridge loaded into the cartridge chamber and a controlling portion to control the mode change-over means, wherein said detector can be changed over selectively to (1) a first position at which said detecting portion protrudes out of the perforated hole of the cartridge chamber into the cartridge chamber at the same time said controlling portion retains the mode change-over means at its first position, and to (2) a second position at which said detecting portion is retracted out of the cartridge chamber at the same time the controlling portion retains the mode changeover means at its second positon; and p. an urging means to always bias the detector to the direction of its first position;

whereby, when the sound film cartridge is loaded into the second film cartridge, the detecting portion is retracted to outside of the cartridge chamber by the part contributing to formation of the second recording opening of the sound film cartridge resisting the biasing power of the urging means, while the detector is shifted from its first position to its second position.

18. A release device of a motion picture camera capable of simultaneous sound recording, which uses a roll of photographic sound film having a sound recording zone at its part, and transports said film to a picture formable position of a picture image forming means by a first film transport means, further having a capstan rotatable about a fixed axis and a movable pressure roller capable of shifting to a position to engage with said capstan and a position to disengage therefrom, being positioned for sandwiching the running path of said film, and can simultaneously record picture image information and sound information by transporting said film to a sound signal recordable position by a second transport means capable of feeding the film with almost constant speed as said pressure roller comes into pressing contact with said capstan, comprising:

a. a first driving means to drive the first transport means;

b. a first switch means to control initiation and stopping of the first driving means:

c. a second driving means to drive the second transport means;

d. a second switch means to control initiation and stopping of the second driving means; and e. a release means having:

1. a trigger means which can be selectively shifted to a first position to place the camera in an operating state, and to a second position to place the same in nonoperating state, 2. a first actuating means to control the first switch means, being able to be shifted to a first position to retain the first switch means in a closed state and to a second position to retain the same in an opened state,
3. a second actuating means to control the shifting of the pressure roller, being able to be shifted to a first position for retaining the pressure roller at its engaging position and to a second position for retaining the same at its disengaged position,
4. a third actuating means to control the second switch means and the first actuating means, being able to be shifted to (A) a first position for retaining the second switch means at closed state and retaining the first actuating means at its first position, and to (B) a second position for retaining the second switch means in an opened stated and retaining the first actuating means at its second position,
5. a fourth actuating means to receive the driving power of the second driving means for automatically conducting the shifting of the third actuating means, being able to be shifted to a first positon at which the third actuating means can be moved from its first position to its second position and to a second position at which the same can be moved from its second position to its first position, and
6. a fifth actuating means to control the shifting of the second actuating means and the fourth actuating means, wherein said fifth actuating means is so provided as being linked with the trigger means and can be shifted to (A) a first position to retain the second actuating means and the fourth actuating means at their first positions respectively as the trigger means is at its first position, and to (B) a second position to retain the second actuating means and the fourth actuating means at their second positions respectively as the trigger means is at its second position.

19. A device according to claim 18, in which the release means has a mode change-over means which can have the operating power of the trigger means directly operate on the first actuating means without going through the fifth actuating means.

20. A sound motion picture camera capable of selectively using a strip of silent film able to record picture image information only and a strip of film able to record both picture image information and sound information, comprising:
a. a first transport means for feeding intermittently the film to a picture forming position of a picture image forming means;
b. a trigger means for controlling driving and stopping of the first transport means;
c. a second transport means including:
a capstan driven at a substantially constant speed and positioned at a side of the path of said film,
a pinch roller provided in a position substantially facing said capstan across said film path, and
a shifting means for displacing at least either one of said capstan and pinch roller with respect to each other from a first state wherein said capstan and pinch roller are mutually separated to allow insertion of film therebetween to a second state wherein said capstan and pinch roller are maintained in resilient contact, thereby allowing the transport of the film placed therebetween at a substantially constant speed adapted for sound recording thereon, said shifting means being operable in a selective mechanical link with said trigger means; and
d. a change-over means capable of disconnecting selectively said mechanical link between said trigger means and said shifting means.

21. A sound motion picture camera capable of using a film cartridge containing a strip of silent film capable of recording both picture image information and sound information, comprising:
a. a housing provided with a cartridge chamber for accommodating said film cartridge;
b. a first transport means for feeding the film intermittently to a picture forming position of a picture image forming means;
c. a trigger means for controlling driving and stopping of the first transport means;
d. a second transport means including:
a capstan driven at a substantially constant speed and positioned at a side of the path of said film,
a pinch roller provided in a position substantially facing said capstan across said film path, and
a shifting means for displacing at least either one of said capstan and pinch roller with respect to each other from a first state wherein said capstan and pinch roller are mutually separated to allow insertion of film therebetween to a second state wherein said capstan and pinch roller are maintained in resilient contact thereby allowing the transport of the film placed therebetween at a substantially constant speed adapted for sound recording thereon, said shifting means being operable in a selective mechanical link with said trigger means; and
e. a means for detecting the loading of said film cartridge into said cartridge chamber and establishing said mechanical link between said trigger means and said shifting means upon such detection.

22. A sound motion picture camera having a cartridge chamber provided with a hole for detecting cartridge loading which hole is formed in a position opposite to one wall of a film cartridge when the film cartridge containing a strip of sound film capable of recording both picture image information and sound information is loaded, comprising:
a. a first transport means for feeding the film intermittently to a picture forming position of a picture image forming means;
b. a trigger means for controlling driving and stopping of the first transport means;
c. a second transport means including:
a capstan driven at a substantially constant speed and positioned at a side of the path of said film;
a pinch roller provided in a position substantially facing said capstan across said film path; and
a shifting means for displacing at least either one of said capstan and pinch roller with respect to each other from a first state wherein said capstan and pinch roller are mutually separated to allow insertion of film therebetween to a second state wherein said capstan and pinch roller are maintained in resilient contact thereby allowing the transport of the film placed therebetween at a substantially constant speed adapted for sound recording thereon, said shifting means being operable in a selective mechanical link with said trigger means;
d. a detecting means having a detecting portion arranged in the detecting hole of the cartridge chamber for detecting the loading of a cartridge in the cartridge chamber, and a changing portion for mechanically linking the trigger means and the shifting means, said detecting means being movable to (1) a first position at which the detecting portion extends into the chamber and the changing portion puts the trigger means and the shifting means in a non-engaged state, and to (2) a second position where the detecting portion retards the chamber and the changing portion puts the trigger means the shifting means in engaged state; and
e. biasing means for biasing the detecting means to the first position, whereby the detecting means is moved from the first position to the second position by the pressure of the cartridge against the biasing force of the biasing means when the cartridge is loaded in the cartridge chamber.

* * * * *